United States Patent
Moore et al.

(10) Patent No.: US 11,870,666 B2
(45) Date of Patent: *Jan. 9, 2024

(54) SYSTEM TO COLLECT AND VISUALIZE SOFTWARE USAGE METRICS

(71) Applicant: Palantir Technologies Inc., Palo Alto, CA (US)

(72) Inventors: Cody Moore, Menlo Park, CA (US); Yiwei Gao, Palo Alto, CA (US); Andrew Colombi, San Francisco, CA (US); David Karesh, Palo Alto, CA (US); William Ward, New York City, NY (US); Alexander Ince-Cushman, San Francisco, CA (US); Mohammad Bukhari, Palo Alto, CA (US); Daniel Kozlowski, Palo Alto, CA (US); Jason Richardson, Arlington, VA (US)

(73) Assignee: PALANTIR TECHNOLOGIES, INC., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,464

(22) Filed: Aug. 9, 2022

(65) Prior Publication Data

US 2023/0025877 A1    Jan. 26, 2023

Related U.S. Application Data

(63) Continuation of application No. 16/730,561, filed on Dec. 30, 2019, now Pat. No. 11,444,854, which is a continuation of application No. 15/178,387, filed on Jun. 9, 2016, now Pat. No. 10,554,516.

(51) Int. Cl.
| G06F 15/173 | (2006.01) |
| H04L 43/045 | (2022.01) |
| H04N 1/00 | (2006.01) |
| H04L 67/01 | (2022.01) |

(52) U.S. Cl.
CPC ............ *H04L 43/045* (2013.01); *H04L 67/01* (2022.05); *H04N 1/00506* (2013.01)

(58) Field of Classification Search
None
See application file for complete search history.

(56) References Cited

U.S. PATENT DOCUMENTS

| 9,317,395 B2* | 4/2016 | Wood ................. G06F 11/3409 |
| 2002/0091811 A1* | 7/2002 | Schweitzer ........... H04M 15/55 |
| | | 707/E17.005 |
| 2006/0168107 A1* | 7/2006 | Balan .................... G06F 9/5083 |
| | | 709/218 |

(Continued)

*Primary Examiner* — Yves Dalencourt
(74) *Attorney, Agent, or Firm* — Faegre Drinker Biddle & Reath LLP

(57) ABSTRACT

Example embodiments involve a metrics collection system for collecting software usage metrics from one or more client devices at deployments. A computer, such as a server configured to execute the metrics collection system, collects software usage metrics (e.g., as a metrics submission from a client device) of the software product at the deployment, identifies a metrics type of the software usage metrics collected, assigns the software usage metrics to a metrics category, and calculates and updates a metrics score of the metrics category, based on the software usage metrics collected.

17 Claims, 14 Drawing Sheets

(56) References Cited

U.S. PATENT DOCUMENTS

| | | | | |
|---|---|---|---|---|
| 2010/0269087 A1* | 10/2010 | Kabra | ............... | G06Q 10/06 |
| | | | | 717/101 |
| 2013/0124669 A1* | 5/2013 | Anderson | ............. | G06F 11/301 |
| | | | | 709/224 |
| 2013/0124720 A1* | 5/2013 | Wood | ................ | G06F 11/3409 |
| | | | | 709/224 |
| 2014/0379934 A1* | 12/2014 | Brooks | ................ | H04L 67/142 |
| | | | | 709/228 |
| 2015/0170382 A1* | 6/2015 | Bhatia | ................ | G06Q 40/00 |
| | | | | 345/440 |
| 2019/0108063 A1* | 4/2019 | Ficet | ................ | H04L 41/0896 |

* cited by examiner

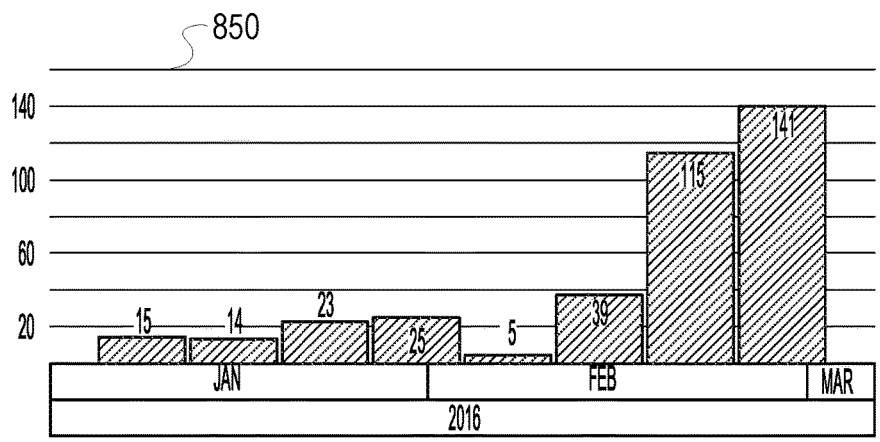
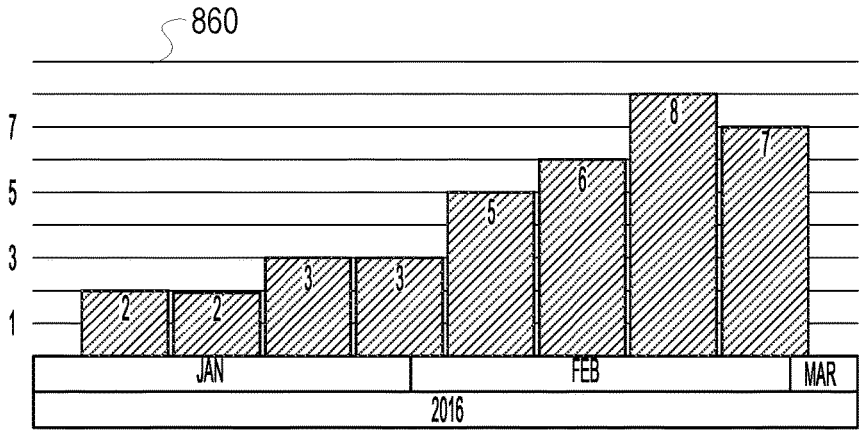
FIG. 8

1300

MANUAL PRODUCT METRIC SUBMISSION FORM

INPUT BELOW: Select your deployment and the date of report (first day of the week for which you are reporting unique logins) and then input the values. Verify your entries were submitted via table below.

SELECT DEPLOYMENT: —1310

DATE OF REPORT: —1320
[📅 WHEN?]

SW VERSION: [e.g. 3.13.3.1] —1330    UNIQUE WEEKLY LOGINS: [e.g. 74] —1340

[SUBMIT]  [Submission result...] —1350

HISTORICAL DATA —1360

| published_time | generation_time | metric | value |
| --- | --- | --- | --- |
| | | | |

HOME

*FIG. 13*

SYSTEM TO COLLECT AND VISUALIZE SOFTWARE USAGE METRICS

PRIORITY APPLICATION

This application is a continuation of U.S. patent application Ser. No. 16/730,561, filed Dec. 30, 2019, which is a continuation of U.S. patent application Ser. No. 15/178,387, filed Jun. 9, 2016, the disclosures of which are incorporated herein in their entirety by reference.

TECHNICAL FIELD

The subject matter disclosed herein relates to graphical user interfaces for the presentation and visualization of data. In particular, example embodiments may relate to machines configured to collect metrics data of software, and generate and display visualizations of the metrics data with a specially configured interface.

BACKGROUND

In order to identify bugs and areas that may need improvement in software products, software developers may look at usage metrics of software products at one or more user devices. Usage metrics describe what features of a software product are used and how those features are used by users of the software products.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIG. 8 is an interface diagram illustrating a portion of a metrics visualization interface, according to some example embodiments.

FIG. 13 is an interface diagram illustrating a manual metrics submission form, according to some example embodiments.

DETAILED DESCRIPTION

Figure 1:
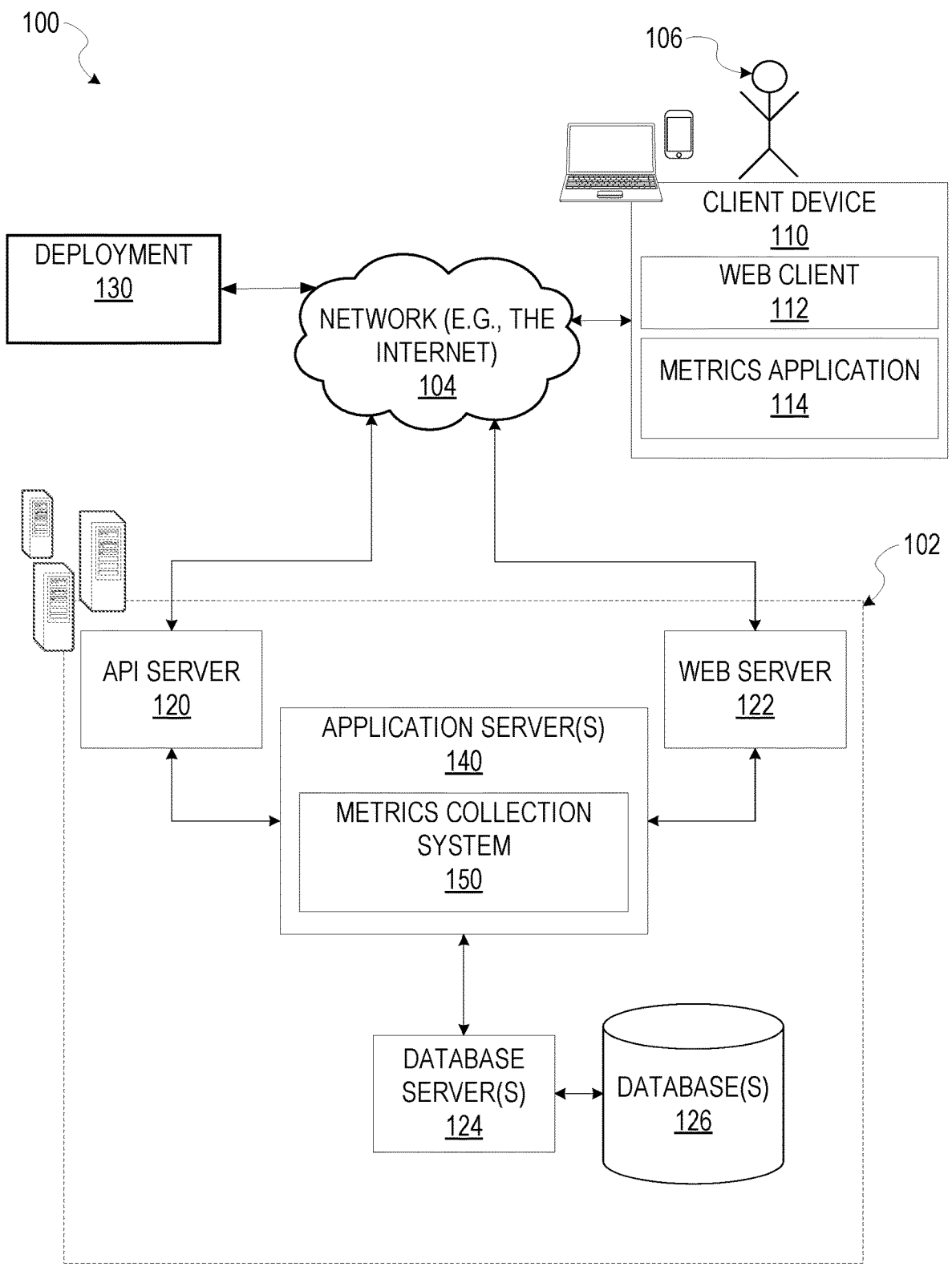
FIG. 1 is a network diagram depicting a networked system comprising one or more application servers in communication with a network-based metrics collection system configured for collecting software usage metrics data from one or more devices, according to some example embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided.

As noted above, usage metrics of software products may be analyzed by software developers to identify bugs and areas which may require improvement. In cases where there are multiple software products executing at a large number of client devices, the collection and analysis of the software usage metrics quickly becomes unmanageable due to the volume and diversity of the usage metrics collected. For example, usage metrics gathered from a first client device related to a software product may be dramatically different from usage metrics of the same software product executing at a second client device, due to differences in the host systems, as well as differences in tasks being executed with the software product. Therefore, making sense of usage metrics without the aid of computer generated visualizations is time consuming and difficult—especially when considering that many of the software usage metrics gathered may pertain to intangible aspects of the software products themselves. Thus, a system and method to standardize and collect software usage metrics and to generate and cause display of visualizations of the software usage metrics would be an advantage.

Example embodiments involve a metrics collection system for collecting software usage metrics from one or more client devices at deployments. The term "deployments," as used herein, refers to a group of devices configured to execute a version of a software product. For example, a deployment may include one or more devices configured to execute one or more distinct or similar products of the same or even a different versions. A computer, such as a server configured to execute the metrics collection system, collects software usage metrics (e.g., as a metrics submission from a client device) of the software product at the deployment, identifies a metrics type of the software usage metrics collected, assigns the software usage metrics to a metrics category, and calculates and updates a metrics score of the metrics category, based on the software usage metrics collected.

The software usage metrics collected by the metrics collection system include a rate or frequency with which features of a software product are executed, a number of devices executing the software product at a deployment, a number of deployments executing versions of the software product, a number of unique users, a number of failed login attempts (e.g., by location, user, or day), a frequency of use of the software product, a frequency of crashes, bug reports, and performance metrics related to a speed or efficiency of actions of the software product. As a means of standardization, the metrics collection system may include a metrics application that executes at client devices, to quantify and format metrics submissions for the metrics collection system. The usage metrics of the metrics submissions may be based on a "Uniform Metrics Identifier" (UMI) that quantifies, based on what the software product is, what the actual metric collected is, and what the point or duration scale of the metric is, and a value of the metric.

The UMI may comprise three types of information: a group (e.g., the software product the metric is related to); a metric (e.g., what is being measured); and a duration (e.g., a timeframe over which the measurement was made, or an indication if the measurement is just a point value). For example, based on the UMI, the usage metrics may be formatted as a concatenation of strings associated with the above components, separated by ":" in the following form:
<Group>:<Metric>:<Duration>

In some example embodiments, the "<Group>" and "<Metric>" component of the UMI can be further split out into terms separated by "." in the following form:
<G-term-1>.<G-term-2>.<G-term-N>:<M-term-1>.<M-term-2>.<M-term-N>:<Duration>

The "<Group>" string indicates what the metric is in reference to. As used herein, the "<Group>" string identifies a particular software product (e.g., from among a corpus of products). The "<Group>" portion of the UMI may consist of an arbitrarily nested set of terms that provide increasing levels of specificity from left to right. Similarly, the "<Metric>" portion of the UMI may describe what feature of the software product is being measured (e.g., a rate of use of distinct features of the software product, number of unique users, etc.) and may also consist of an arbitrarily nested set of terms that provide increasing levels of specificity from left to right.

The "<Duration>" string indicates a metrics type of the collected software usage metrics. In general, there are two types of metrics as discussed herein: point measurements and duration measurements. A point measurement refers to a metric that is taken at an instant in time (e.g., version number). For point measurements, the "<Duration>" component of the UMI may be omitted entirely. A duration measurement refers to an observation over a period of time. Duration measurements are designated in the UMI by appending the associated timeframes as a string. For example, "<Duration>" strings may include "MONTHLY," "WEEKLY," "DAILY," "HOURLY," and so on.

For each received metrics submission, the metrics collection system proceeds to identify a metrics type of the usage metrics collected based on the UMI discussed above. The metrics collection system may then assign the usage metrics of the metrics submission to an appropriate metrics category (e.g., issues, engagement, growth, etc.), based on the metrics type and information within the UMI, such as the "<Metric>" string. For example, an administrator of the metrics collection system may provide metrics category definitions that assign all metrics related to a number of login attempts, a number of program crashes, and a number of software reboots of a software product at a deployment to a "issues" metrics category, and the administrator may assign a rate of increase in usage, a rate of increase of unique users, and a number of systems that upgrade to a newer version of the software product to the "growth" metrics category. As the metrics collection system receives metrics submissions, the metrics collection system may categorize the software usage metrics data of the metrics submissions into categories based on the corresponding UMI, and category definitions provided by an administrator of the metrics collection system. The metrics collection system calculates a metrics score of each metrics category based on the usage metrics collected.

In some example embodiments, the metrics collection system generates and causes display of a graphical user interface at a client device to receive visualization requests. For example, the graphical user interface displayed at the client device may include a set of menus configured to receive visualization requests, wherein the visualization requests include an indication of a metrics category, a deployment, a timeframe or duration, and a visualization type. In response to receiving the visualization request, the metrics collection system generates and causes display of the visualization within the graphical user interface at the client device.

FIG. 1 is a network diagram illustrating a network environment 100 suitable for operating a metrics collection system 150, according to some example embodiments. A networked system 102 provides server-side functionality, via a network 104 (e.g., an intranet, the Internet, or a Wide Area Network (WAN)), to one or more clients such as a client device 110 (operable by a user 106) and a deployment 130. FIG. 1 illustrates a web client 112 and a metrics application 114 executing on the client device 110.

An Application Program Interface (API) server 120 and a web server 122 are coupled to, and provide programmatic and web interfaces respectively to, one or more application servers 140. The application servers 140 host the metrics collection system 150. The application servers 140 are, in turn, shown to be coupled to one or more database servers 124 that facilitate access to one or more databases 126.

The metrics collection system 150 performs operations that include receiving metrics submissions that include software usage metrics from the deployment 130 and the client device 110, identifying a metrics type of the software usage metrics, categorizing the software usage metrics, and generating and causing display of a visualization of the software usage metrics within a graphical user interface, for the networked system 102. The deployment 130 may be or include a database (e.g., similar to the database 126). In some example embodiments, the deployment 130 includes a web server machine operated by a third party (e.g., an entity distinct from the metrics collection system 150).

As shown, the network environment 100 includes the client device 110 in communication with the networked system 102 over the network 104. The networked system 102 communicates and exchanges data with the client device 110 that pertains to various functions and aspects associated with the networked system 102 and its users. Likewise, the client device 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by the user 106 (e.g., a person) to exchange data with the networked system 102 over the network 104.

The client device 110 communicates with the network 104 via a wired or wireless connection. For example, one or more portions of the network 104 may comprise an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the networked system 102 may involve user-selected functions available through one or more user interfaces (UIs). The UIs may be specifically associated with the web client 112 (e.g., a browser) or the metrics application 114, executing on the client device 110, and in communication with the networked system 102. In further embodiments, the UIs may be served to the client device 110 through an encrypted transport layer (i.e., SSL.TLS).

Turning specifically to the networked system 102, the web server 122 is coupled to (e.g., via wired or wireless interfaces), and provides web interfaces to, the application server 140. In some embodiments, the metrics collection system 150 runs and executes on the application server 140, while in other embodiments, the application server 140 provides the client device 110 with a set of instructions (e.g., computer-readable code) that causes the web client 112 and the metrics application 114 of the client device 110 to execute and run the metrics collection system 150.

Figure 2:
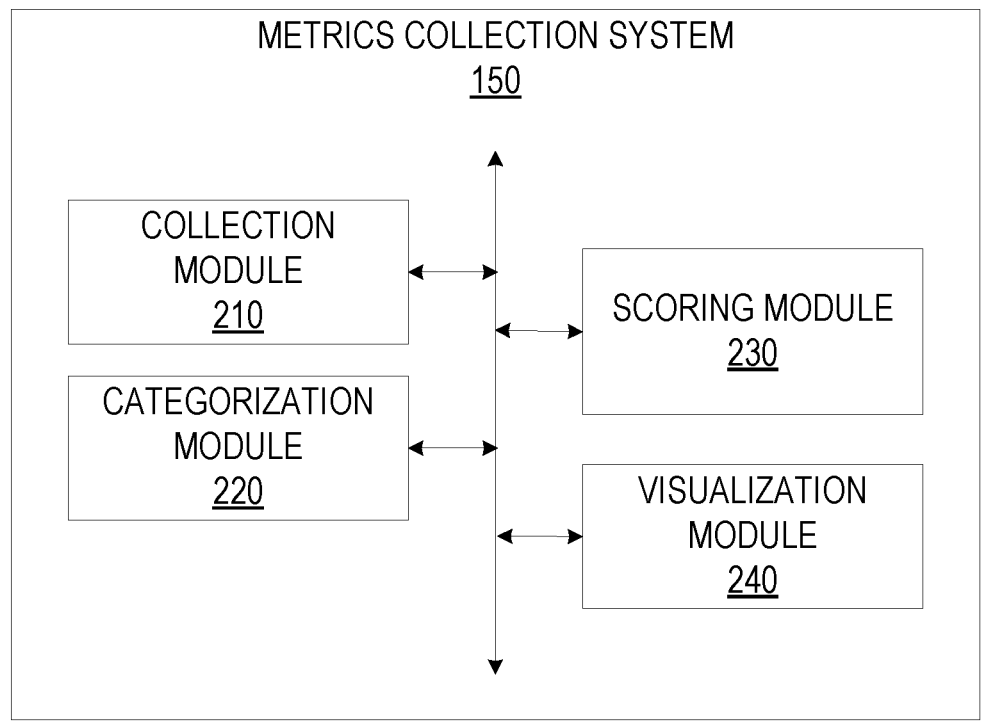
FIG. 2 is a block diagram illustrating various components of the metrics collection system, which is provided as part of the networked system, according to some example embodiments.

FIG. 2 is a block diagram illustrating various components of the metrics collection system 150, which is provided as part of the networked system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the metrics collection system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and a processor of a machine) for executing the logic. Furthermore, the various functional components depicted in FIG. 2 may reside on a single computer (e.g., a laptop), or may be distributed across several computers in various arrangements such as cloud-based architectures. Moreover, it shall be appreciated that while the functional components (e.g., modules) of FIG. 2 are discussed in the singular sense, in other embodiments, multiple instances of one or more of the modules may be employed.

The metrics collection system 150 is shown as including a collection module 210, a categorization module 220, a scoring module 230, and a visualization module 240, all configured to communicate with each other (e.g., via a bus, shared memory, a switch, or APIs).

The collection module 210 obtains metrics submissions from multiple data sources. Data sources for metrics submission data that includes software usage metrics include the deployment 130, as well as the client device 110. The deployment 130 may comprise a set of devices executing one or more software products. The metrics submissions include software usage metrics, formatted based on the UMI (as discussed above).

The categorization module 220 identifies a data type of the software usage metrics of the metrics submission based on the UMI, and assigns the software usage metrics to a metrics category. Metrics categories may include, but are not limited to, "issues," "growth," "engagement," and "performance." In some example embodiments, an administrator of the metrics collection system 150 may provide additional metrics category definitions to the categorization module 220. Metrics category definitions include a metrics category identifier, and a corresponding list of features from the UMI for the metrics category identifier. In this way, an administrator of the metrics collection system 150 may define new metrics categories, or add features to existing metrics categories.

The scoring module 230 calculates a metrics score of each metrics category of each deployment, each individual system, and each software product. The score calculated by the scoring module 230 is based on the software usage metrics collected by the collection module 210. For example, the scoring can be done on an aggregated level to aggregate metrics themselves. Consider an example embodiment in which a deployment (e.g., deployment A) includes two devices (e.g., first device and second device) that are running a software product (e.g., Software Product A). The first device may report ten unique users in a particular week and the second device may report thirty unique users in the same week, where each metric (i.e., unique user logins) is an aggregate of login events on each device. The scoring module 230 may thereby apply a scoring calculation to quantify all deployments running "Software Product A," or vice versa, all software products installed on Deployment A itself, in order to calculate a state/score for the quantification. In some embodiments, the scoring calculation may manifest as an algorithm that causes the scoring module 230 to count all instances of "Software Product A" running with more than fifteen users, and give the client device one point, then sum the points up for all devices to get a score.

The visualization module 240 receives visualization requests from one or more client devices. The visualization requests include indications of a visualization type (e.g., bar graph), a metrics category or feature, and a time period. The visualization module 240 generates and causes display of a visualization at the client device (e.g., client device 110) based on the visualization request.

Figure 3:
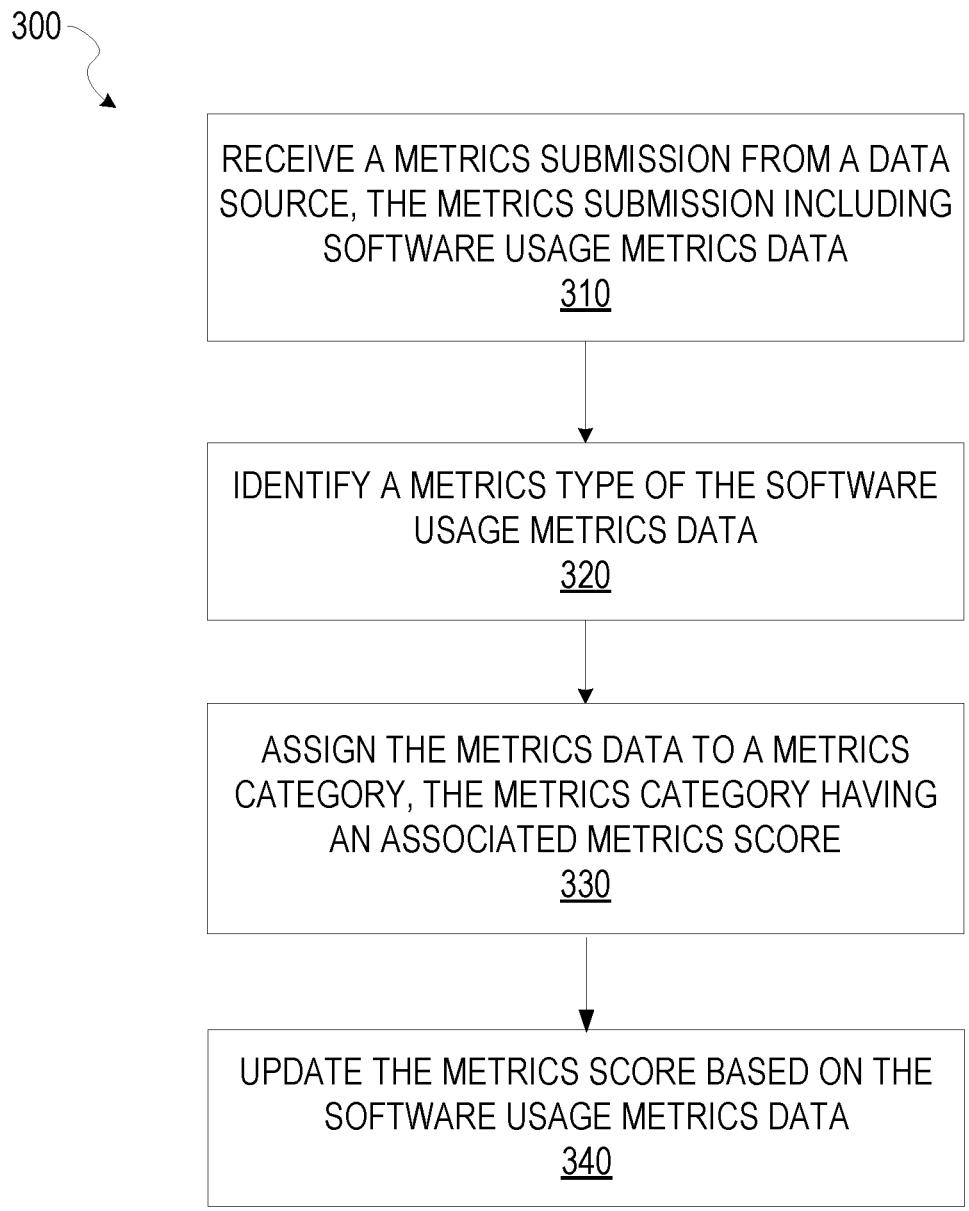
FIG. 3 is a flowchart illustrating a method for collecting software usage metrics data from a deployed system, and updating a metrics score associated with the software usage metrics data, according to some example embodiments.

FIG. 3 is a flowchart illustrating operations of the metrics collection system 150 in performing a method 300 for collecting software usage metrics from a data source (e.g., a deployment), categorizing the usage metrics, and updating a metrics score associated with the metrics category corresponding to the usage metrics, according to some example embodiments. The method 300 is embodied in computer-readable instructions for execution by one or more processors, such that the operations of the method 300 are performed in part or in whole by the metrics collection system 150; accordingly, the method 300 is described below by way of example with reference thereto. However, it shall be appreciated that at least some of the operations of the method 300 may be deployed on various other hardware configurations, and the method 300 is not intended to be limited to the metrics collection system 150.

At operation 310, the collection module 210 receives a metrics submission from a data source. The metrics submission may be delivered to the metrics collection system 150 as an e-mail, as a manual user submission, or through a distributed queue messaging service. For example, manual user submissions may be accomplished via API through a front end GUI. Message queues provide an asynchronous communications protocol, meaning that the sender and receiver of the message do not need to interact with the message queue at the same time. Messages placed onto the queue are stored until the recipient retrieves them. Message queues have implicit or explicit limits on the size of data that may be transmitted in a single message and the number of messages that may remain outstanding on the queue.

As an example of the forgoing operation, the metrics application 114 may cause display of a graphical user interface configured to receive and transmit metrics submissions at a client device 110. The user 106 of the client device 110 may submit a metrics submission (e.g., a UMI) to the metrics collection system 150 through the interface. The software usage metrics are then collected automatically by the metrics application 114, and delivered to the metrics collection system 150 through the network 104. For example, the metrics application 114 may monitor various metrics features of a software product (or multiple software products) executing on the client device 110 (or at the deployment 130). The metrics application 114 may then deliver the software usage metrics collected to the collection module 210 as a metrics submission (e.g., UMI).

At operation 320, the categorization module 220 identifies a metrics type of the software usage metrics within the metrics submission, based on a UMI. As discussed above, the UMI includes a field indicating a metrics type of the software usage metrics collected. The categorization module 220 parses the metrics submission received by the collection module 210 to identify the metrics type.

At operation 330, the categorization module 220 categorizes the software usage metrics data of the metrics submission based on the UMI. As discussed above, the UMI includes a field that identifies the specific feature being measured. The categorization module 220 accesses a list of metrics category definitions, and based on the metrics category definitions and the UMI, categorizes the software usage metrics data. The categorization module 220 may, in some instances, assign the software usage metrics data of the metrics submission to multiple metrics categories.

At operation 340, the scoring module 230 calculates a metrics score of the metrics category (or categories). The metrics score is based on the software usage metrics values collected by the collection module 210.

Figure 4:
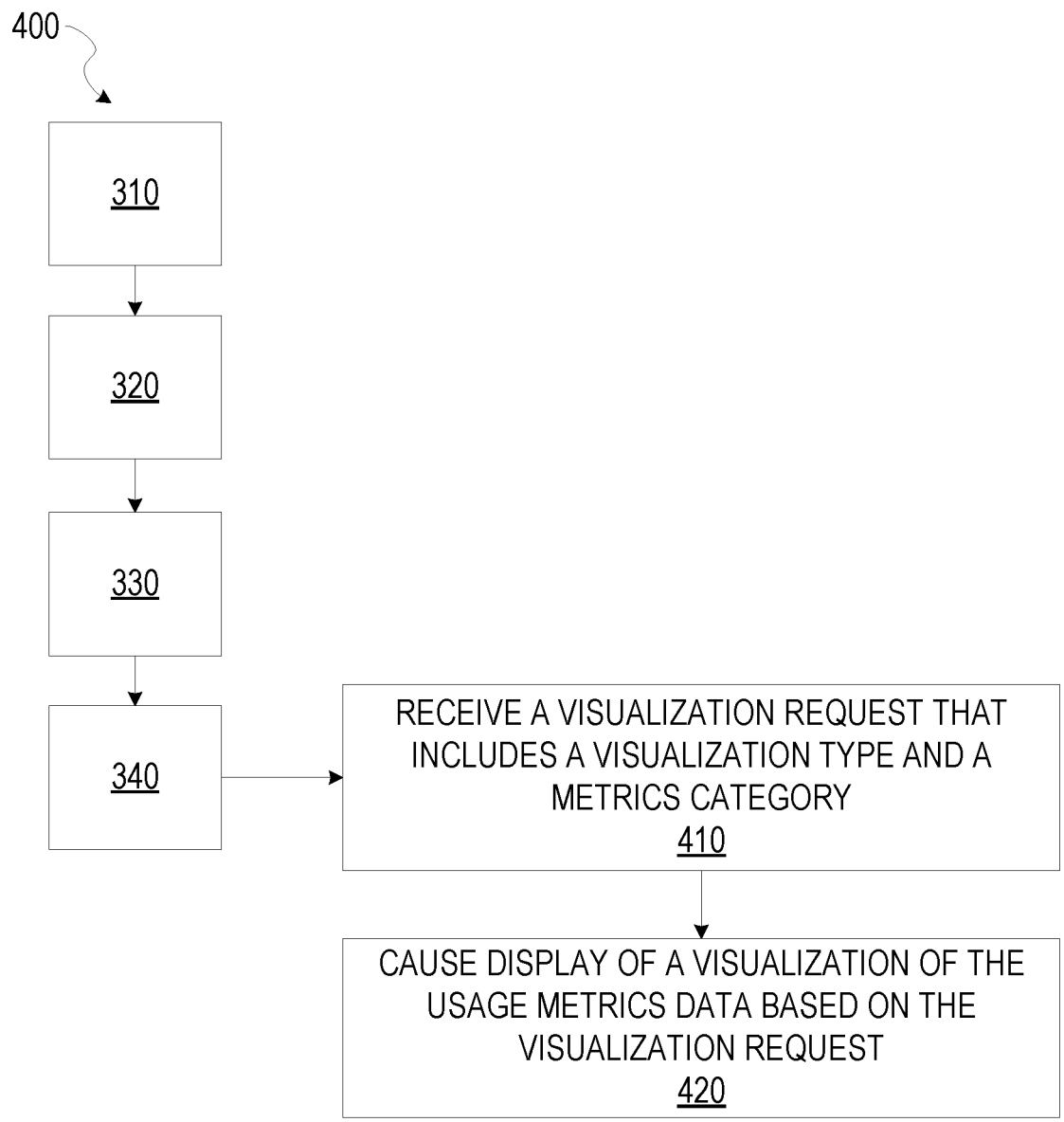
FIG. 4 is a flowchart illustrating a method for causing display of a visualization of software usage metrics data, according to some example embodiments.

FIG. 4 is a flowchart illustrating a method 400 for generating and causing display of a visualization of software usage metrics data at a client device 110, according to some example embodiments. As shown in FIG. 4, one or more operations 410 and 420 may be performed as part (e.g., a precursor task, a subroutine, or a portion) of operation 340, in which the scoring module 230 updates a metrics score of the metrics categories based on metrics submissions collected by the collection module 210, according to some example embodiments.

At operation 410, the visualization module 240 receives a visualization request from a client device (e.g., client device 110). The visualization request may include a set of visualization criteria, such as a visualization type, as well as an indication of a deployment or client device, metrics category, feature to visualize, and software product identifier. In some example embodiments, the visualization module 240 causes display of a visualization interface at a client device (e.g., the client device 110). A user of the client device 110 may provide the visualization criteria through one or more interface elements of the visualization interface. The interface elements may include drop down menus, text fields, and user selectable icons.

At operation 420, in response to receiving the visualization request, the visualization module 240 generates and causes display of a visualization of the software usage metrics data at the client device 110. Examples of visualizations generated and displayed by the visualization module 240 can be seen in FIGS. 8-11. In some embodiments, the visualization module 240 receives a selection of a visualization type (e.g., bar graph), and generates a visualization based on the selection. In some embodiments, the visualization module 240 may select a visualization type based on elements of the visualization request itself, such as the deployment or product selected.

Figure 5:
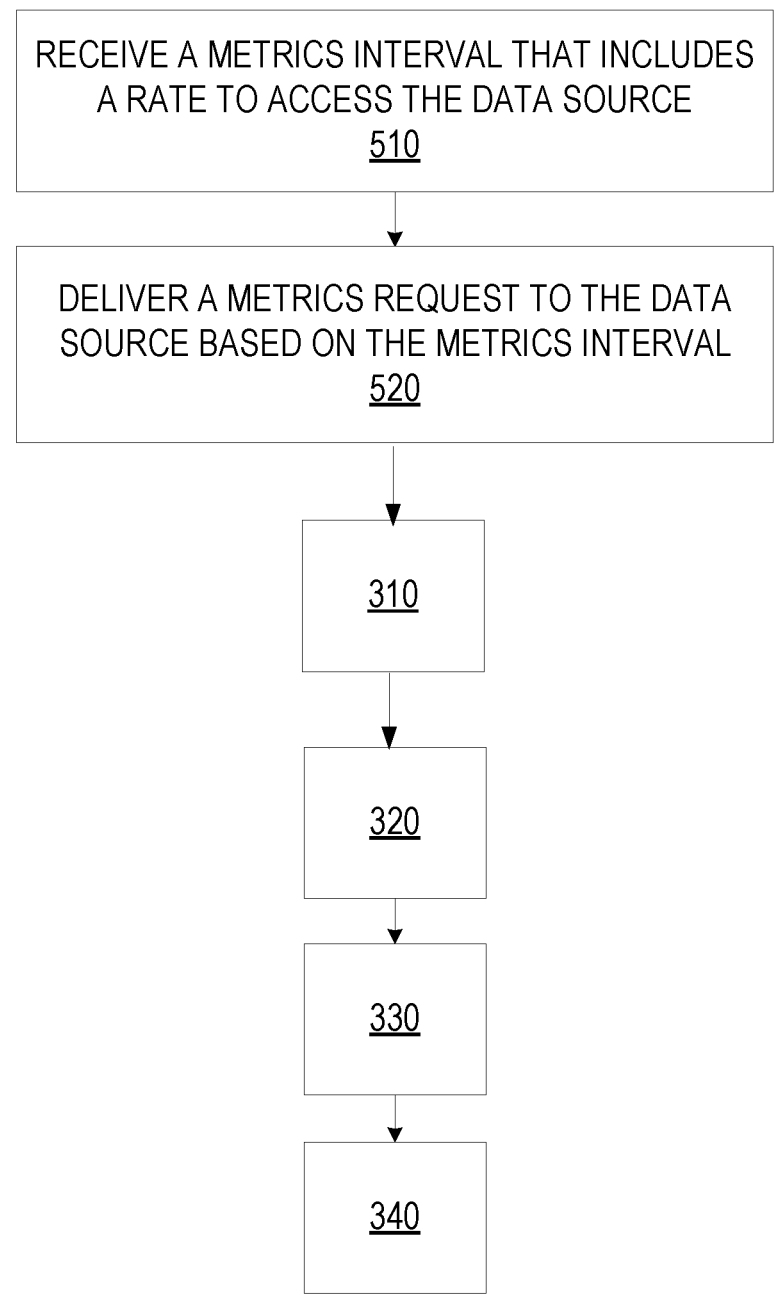
FIG. 5 is a flowchart illustrating a method for defining a metrics interval of the metrics collection system, according to some example embodiments.

FIG. 5 is a flowchart illustrating a method 500 for defining a metrics interval to receive metrics submissions, according to some example embodiments. As shown in FIG. 5, one or more operations 510 and 520 may be performed as part (e.g., a precursor task, a subroutine, or a portion) of operation 310, in which the collection module 210 receives a metrics submission from a data source, according to some example embodiments.

Figure 12:
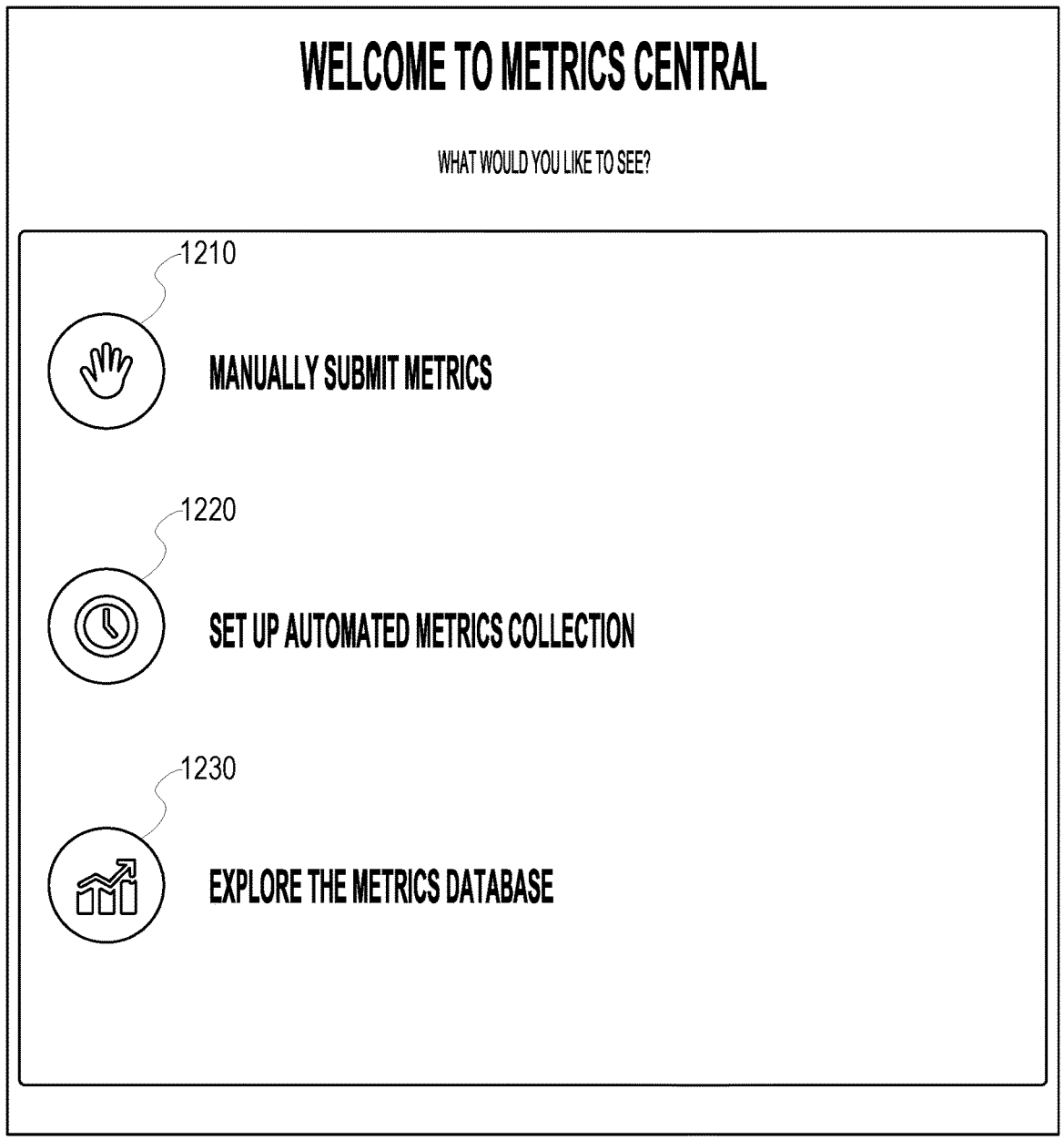
FIG. 12 is an interface diagram illustrating a metrics submission interface, according to some example embodiments.

At operation 510, the collection module 210 receives an automated metrics interval that includes a rate at which to access a data source (e.g., deployment 130, client device 110). For example, to receive the automated metrics interval, the collection module 210 may cause display of a metrics interface to set up automated metrics submissions (as seen in FIG. 12) at a client device. A user may provide a metrics interval definition through the metrics interface to define an automated metrics interval at which to collect and transmit metrics submissions to the metrics collection system 150. For example, the metrics interval definition may include "weekly," as well as "daily." In some example embodiments, the metrics interval definition includes a feature, a software product, a deployment, and a rate at which to collect and provide metrics submissions. In some embodiments, the metrics interval definition configures the metrics application 114 to collect and transmit metrics submissions at the defined rate. In some embodiments, the metrics interval definition configures the collection module 210 to query a data source for the requested metrics based on the metrics interval definition.

At operation 520, based on the metrics interval definition received from the client device 110 through the metrics interface, the collection module 210 delivers a metrics request to the data source (e.g., deployment 130, client device 110). The metrics request includes a feature, a metrics type, a software product, and a period of time over which to retrieve software usage metrics data. Based on the metrics request, the data source provides a metrics submission to the collection module 210.

Figure 6:
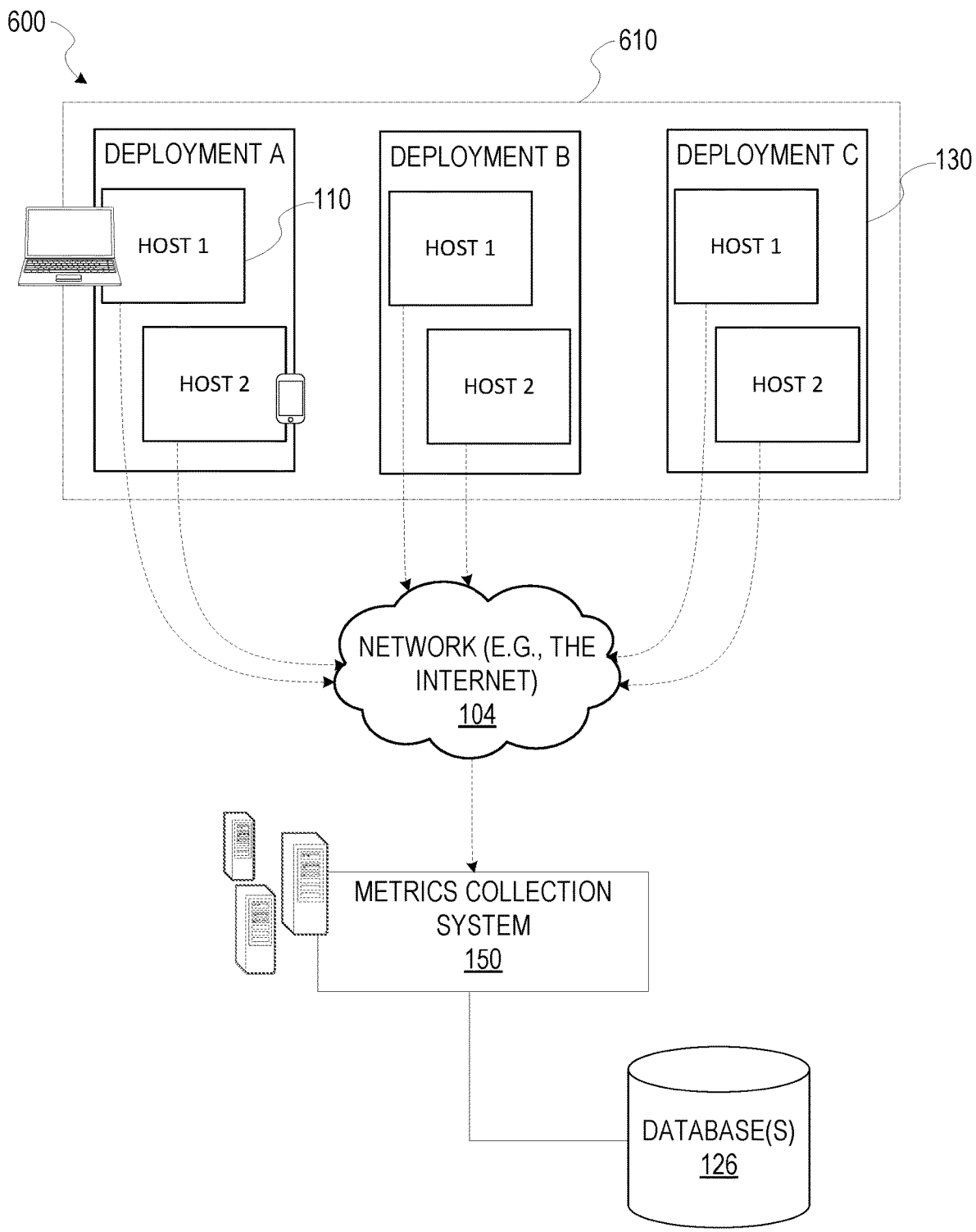
FIG. 6 is a diagram illustrating various interactions between deployed systems and the metrics collection system, according to some example embodiments.

FIG. 6 is a system diagram 600 illustrating various interactions between deployments 610 and the metrics collection system 150, according to some example embodiments. As seen in FIG. 6, the deployments 610 may include one or more deployments (e.g., deployment A, deployment B, deployment C), each comprising one or more host systems (e.g., host 1, host 2). The host systems may include the client device 110, and the deployments 610 may include deployment 130, as seen in FIG. 1. In some example embodiments, each host system may contain one to N metrics applications that may or may not be unique from one another.

The deployments 610 comprise data sources of software usage metrics data for the metrics collection system 150. For example, the deployment 130 of FIG. 6 may comprise a grouping of systems configured to execute a software platform consisting of one or more products. The systems may be grouped based on being a part of the same company or organization, team within a company, or building.

Software usage metrics data in the form of metrics submissions flow from the deployments 610, through the network 104, and into the metrics collection system 150 based on the methods 300, 400, and 500 discussed in FIGS. 3-5. The metrics collection system 150 receives the metrics submissions, and stores the software usage metrics data within the database 126.

Figure 7:
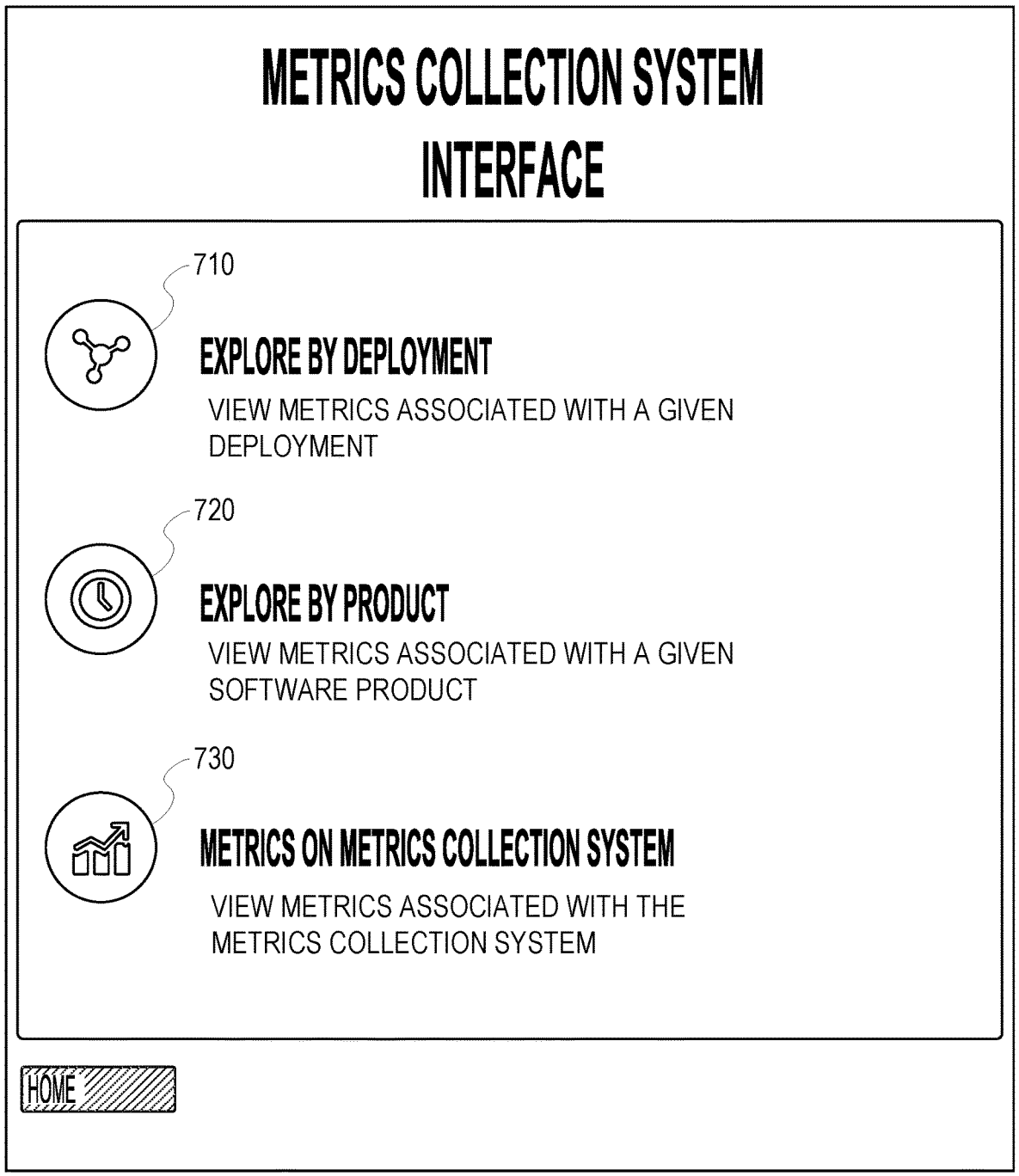
FIG. 7 is an interface diagram illustrating a metrics collection interface, according to example embodiments.

FIG. 7 is an interface diagram illustrating a metrics collection interface 700, according to example embodiments. As shown, the metrics collection interface 700 includes a set of interface elements 710, 720, and 730 configured to receive user inputs to generate and cause display of visualizations of software usage metrics data at a client device 110.

The interface element 710 allows users to submit visualization requests for software usage metrics associated with a deployment. For example, a deployment may execute one or more software products on a number of systems associated with the deployment. A user may select the interface element 710, and in response, be presented with a selectable list of deployments (e.g., deployment 130). By selecting a deployment from the list, the user may be presented with one or more visualization options in order to generate and cause display of a visualization of software usage metrics associated with the selected deployment.

The interface element 720 allows users to submit to visualization requests for software usage metrics associated with a software product across multiple deployments. For example, a single software product may be used in multiple deployments. A user may choose to visualize how the software product is being used across the multiple deployments by selecting the interface element 720. A software product may include a computer program executing at a device (e.g., client device 110).

The interface element 730 allows users to view software usage metrics of the metrics collection system 150, and the metrics application 114. For example, a user may select the interface element 730, and in response be presented with an interface to view software usage metrics of the metrics collection system 150 and metrics application 114.

FIG. 8 is an interface diagram illustrating a metrics visualization interface 800, according to example embodiments. As shown, the metrics visualization interface 800 includes a group selection menu 810 configured to receive a selection of a group identifier (e.g., deployment A), feature identifiers 820 and 830, and a product identifier 840. The metrics visualization interface 800 may be presented at a client device 110 in response to a selection of the interface element 720 of FIG. 7.

Selection of the group selection menu 810 may cause display of a listing of available group identifiers. Each group identifier may correspond to a unique deployment that comprises one or more systems executing software products. For example, if group identifier "deployment A" is selected from the group selection menu 810, the metrics collection system 150 accesses the database 126 to retrieve and present a list of software products executing on devices associated with deployment A. For example, deployment A may have one or more associated devices which execute products 1-5, as show in FIG. 8.

If a product identifier is selected from among the list of product identifiers (e.g., product identifier 840), the metrics collection system 150 causes display of visualizations 850 and 860, based on the feature identifiers 820 and 830. For example, the visualization 850 may depict a visualization of software usage metrics related to the feature identifier 820 (total document views per week) of software product 1. If the product identifier 840 is selected, the metrics visualization interface 800 updates to include visualizations based on software usage data that corresponds to the selected product identifier (e.g., product identifier 840).

Figure 9:
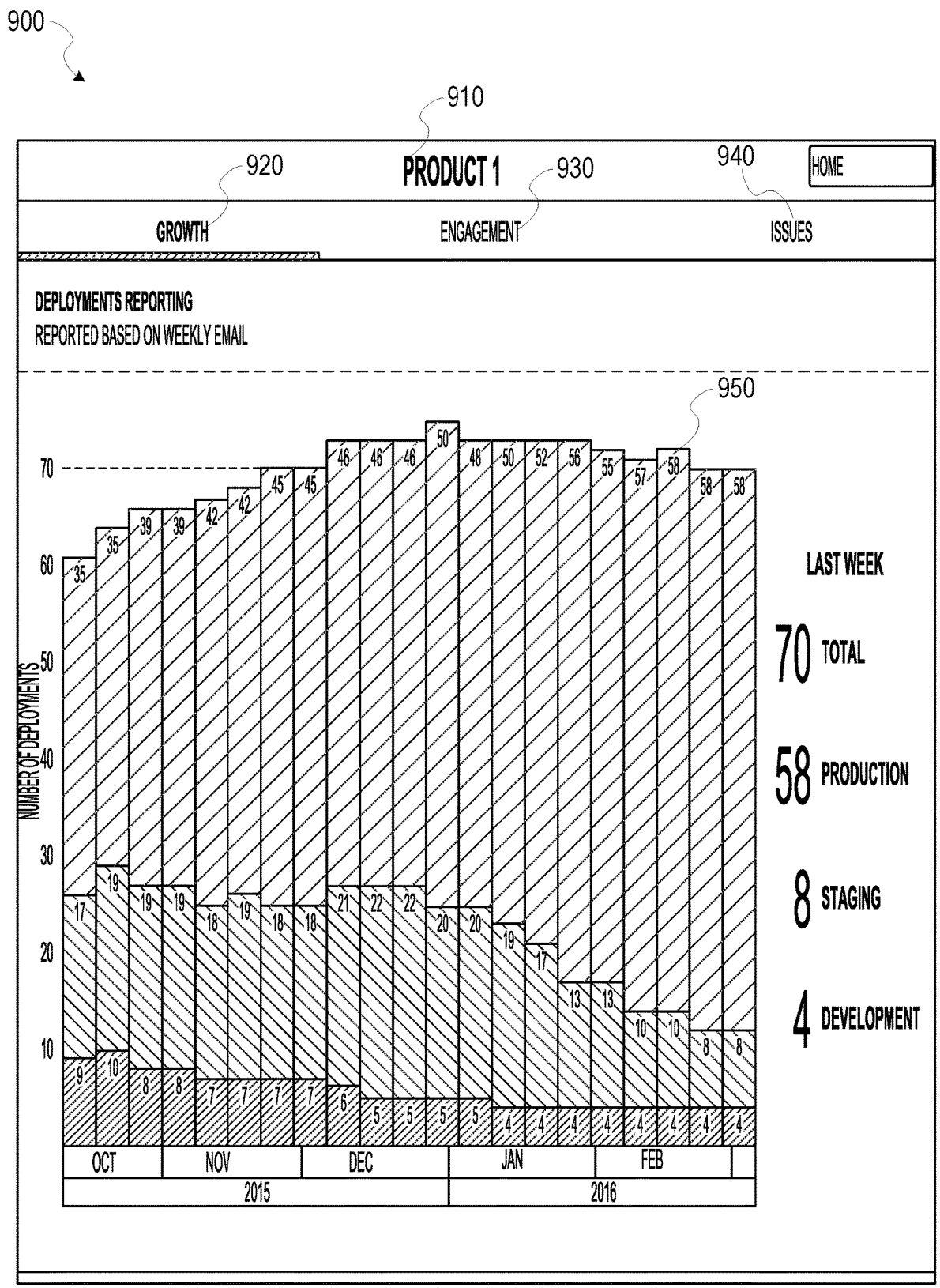
FIG. 9 is an interface diagram illustrating a portion of a metrics visualization interface, according to some example embodiments.

FIG. 9 is an interface diagram illustrating a metrics visualization interface 900, according to example embodiments. As shown, the metrics visualization interface 900 includes a product identifier 910, metrics category identifiers 920, 930, and 940, and a visualization 950. The metrics visualization interface 900 may be presented at a client device 110 in response to a selection of the interface element 720 of FIG. 7.

The metrics visualization interface 900 presents software product-specific metrics (of software product 1), across all deployments which are executing the software product. As shown in FIG. 9, the metrics visualization interface 900 includes a presentation of the metrics category identifiers 920, 930, and 940. As discussed above, the metrics categories may be defined by an administrator of the metrics collection system 150, by methods discussed above in reference to the categorization module 220 depicted in FIG. 2.

A user may select a metrics category identifier (e.g., metrics category identifier 920), and in response the metrics collection system 150 may update the metrics visualization interface 900 to display visualizations generated based on software usage metrics of features related to the selected metrics category.

Figure 10:
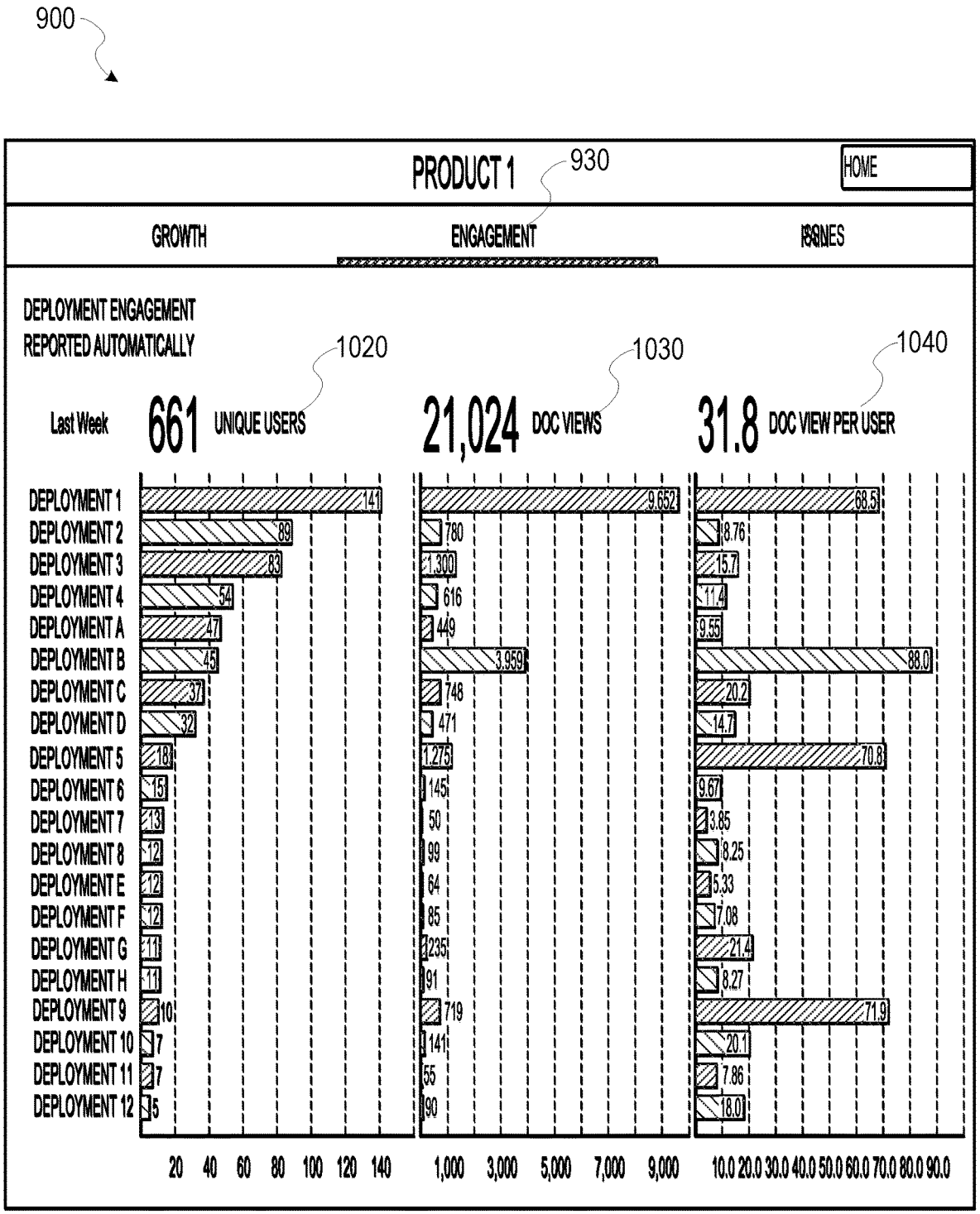
FIG. 10 is an interface diagram illustrating a portion of a metrics visualization interface, according to some example embodiments.
Figure 11:
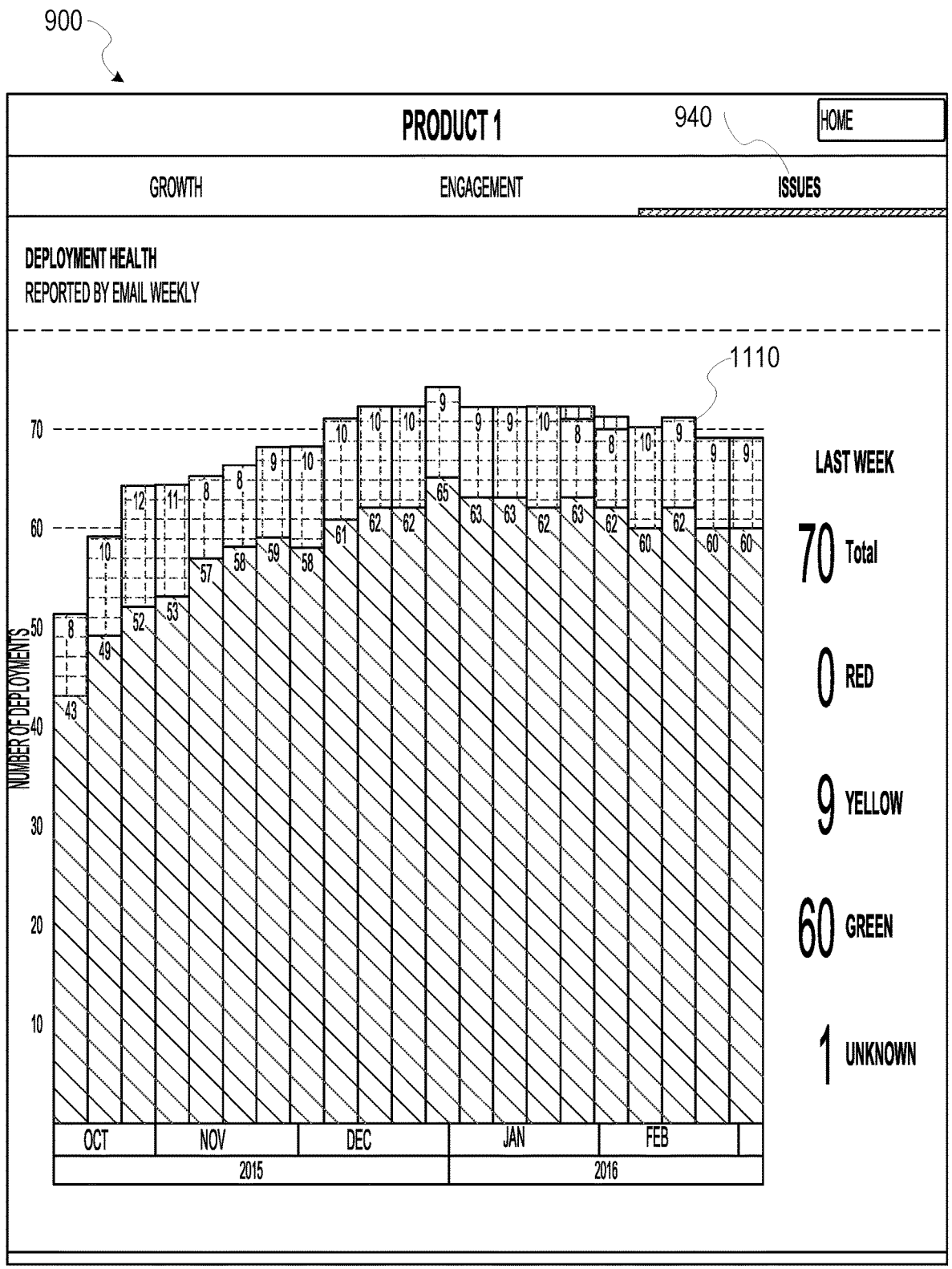
FIG. 11 is an interface diagram illustrating a portion of a metrics visualization interface, according to some example embodiments.

For example, if the user selects the metrics category identifier 930, the metrics visualization interface 900 may update to display visualizations of features 1020, 1030, and 1040 of FIG. 10, based on the metrics category identifier 930 (e.g., engagement metrics). As seen in FIG. 10, the metrics category identifier 930 includes features 1020 (e.g., unique users), 1030 (e.g., document views), and 1040 (document views per user). As explained above, the features 1020, 1030, and 1040 are associated with the metrics category identifier 930 by an administrator of the metrics collection system 150. Similarly, if the user selects the metrics category identifier 940, the metrics visualization interface 900 updates to display a visualization 1110 as shown in FIG. 11, based on software usage metrics data of features associated with the pain metrics category.

FIG. 12 is an interface diagram illustrating a metrics collection interface 1200, according to example embodiments. As shown, the metrics collection interface 1200 includes a set of interface elements 1210, 1220, and 1230 configured to receive user inputs to provide metrics submissions to the metrics collection system 150, according to example embodiments.

Selection of the interface element 1210 causes the metrics collection interface 1200 to display a manual metrics submission form 1300, as seen in FIG. 13. A user may provide metrics submissions manually to the metrics collection system 150, through the manual metrics submission form 1300. The metrics submission may thereby be delivered to the metrics collection system 150 electronically, via email or other similar electronic delivery methods.

Selection of the interface element 1220 causes the metrics collection interface 1200 to display an interface to receive automated metrics, according to the method 500 depicted in FIG. 5. Upon receiving the automated metrics instructions through the interface, the metrics collection system 150 configures itself, or in some embodiments a client device 110 executing a metrics application 114, to retrieve metrics submissions of requested features at defined intervals.

Selection of the interface element 1230 causes the metrics collection interface 1200 to display one or more interface elements to view software usage metrics existing within the metrics collection system 150, at the database 126.

FIG. 13 is an interface diagram illustrating a manual metrics submission form 1300, to manually submit a metrics submission to the metrics collection system 150, according to example embodiments. The manual metrics submission form 1300 includes: a deployment menu 1310; interface elements 1320; 1330, and 1340 to receive metrics submission details as user inputs; a submission result indicator 1350; and a display of historical data 1360, according to example embodiments.

A user 106 of the client device 110, configured to display the manual metrics submission form 1300, may provide metrics submission details through the interface elements 1320, 1330, and 1340. The interface elements may correspond to metrics submission information such as a date of the software usage metrics being submitted (e.g., 1320), a version of the software product which the software usage metrics are associated with (e.g., 1330), and software usage metrics features, such as "unique weekly logins," (e.g., 1340). Upon receiving the metrics submission through the manual metrics submission form 1300, the submission result indicator 1350 updates to display a status of the submission (e.g., success, failed, etc.). The display of historical data 1360 may also update to include the metrics submitted.

Figure 14:
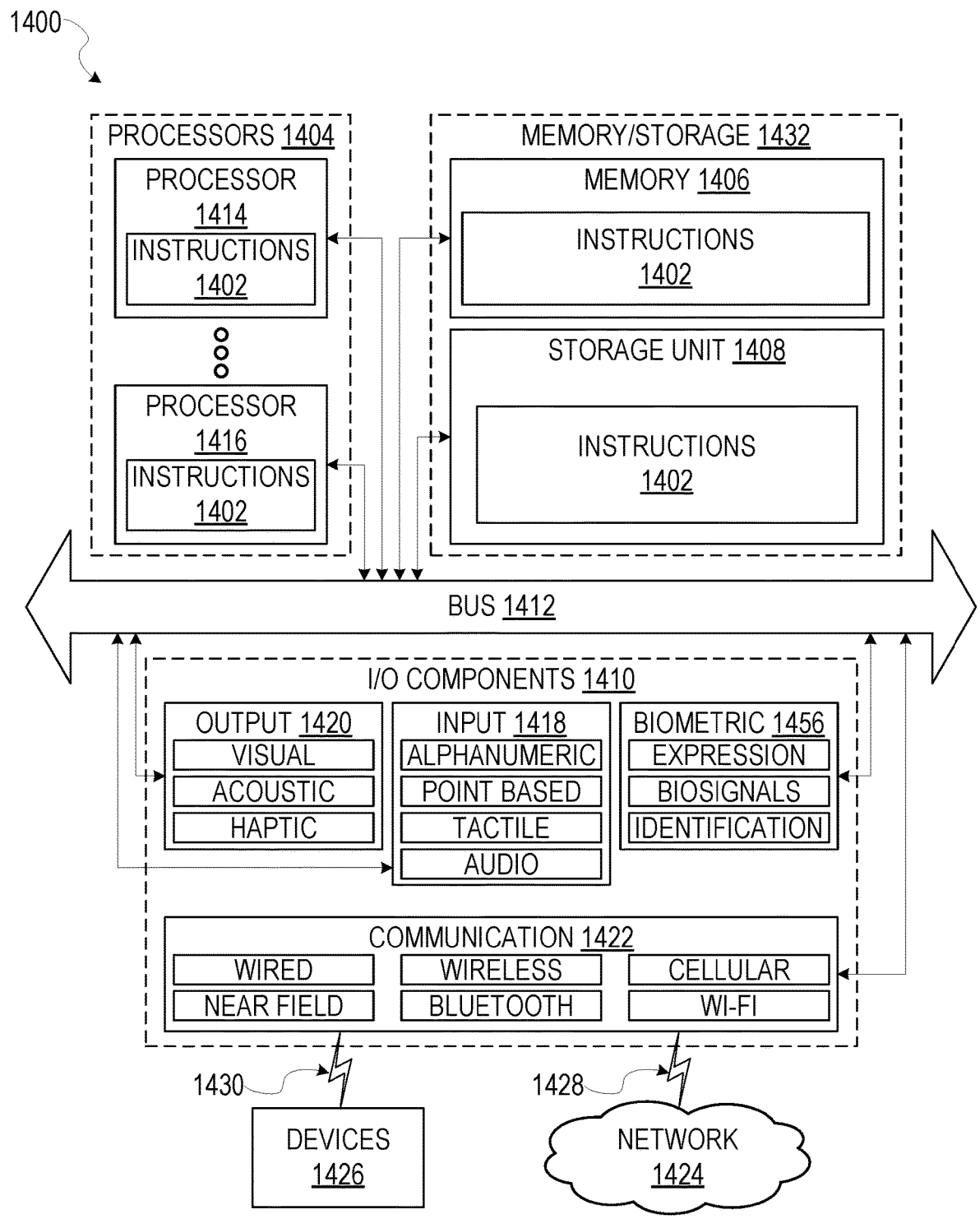
FIG. 14 is a diagrammatic representation of a machine in the example form of a computer system within which a set of instructions for causing the machine to perform any one or more of the methodologies discussed herein may be executed.

FIG. 14 is a diagrammatic representation of a machine 1400 in the example form of a computer system within which a set of instructions for causing the machine to perform any one or more of the methodologies discussed herein may be executed. Specifically, FIG. 14 shows a diagrammatic representation of the machine 1400 in the example form of a system, within which instructions 1402 (e.g., software, a program, an application, an applet, an app, a driver, or other executable code) for causing the machine 1400 to perform any one or more of the methodologies discussed herein may be executed. For example, the instructions 1402 include executable code that causes the machine 1400 to execute the methods illustrated in FIGS. 3-5. In this way, these instructions 1402 transform the general, non-programmed machine into a particular machine programmed to carry out the described and illustrated functions in the manner described herein. The machine 1400 may operate as a standalone device or may be coupled (e.g., networked) to other machines.

By way of non-limiting example, the machine 1400 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 1402, sequentially or otherwise, that specify actions to be taken by the machine. Further, while only a single machine 1400 is illustrated, the term "machine" shall also be taken to include a collection of machines 1400 that individually or jointly execute the instructions 1402 to perform any one or more of the methodologies discussed herein.

The machine 1400 may include processors 1404, a memory/storage 1432, memory 1406, a storage unit 1408, and I/O components 1410, which may be configured to communicate with each other such as via a bus 1412. In an example embodiment, the processors 1404 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1414 and a processor 1416 that may execute the instructions 1402. The term "processor" is intended to include multi-core processors that may comprise two or more independent processors (sometimes referred to as "cores") that may execute instructions contemporaneously. Although FIG. 14 shows multiple processors, the machine 1400 may include a single processor with a single core, a single processor with multiple cores (e.g., a multi-core processor), multiple processors with a single core, multiple processors with multiples cores, or any combination thereof.

The memory 1406 (e.g., a main memory or other memory storage) and the storage unit 1408 are both accessible to the processors 1404 such as via the bus 1412. The memory 1406 and the storage unit 1408 store the instructions 1402 embodying any one or more of the methodologies or functions described herein. In some embodiments, the database 126 resides on the storage unit 1408. The instructions 1402 may also reside, completely or partially, within the memory 1406, within the storage unit 1408, within at least one of the processors 1404 (e.g., within the processor's cache memory), or any suitable combination thereof, during execution thereof by the machine 1400. Accordingly, the memory 1406, the storage unit 1408, and the memory of the processors 1404 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store the instructions 1402. The term "machine-readable medium" shall also be taken to include any medium, or combination of multiple media, that is capable of storing instructions (e.g., instructions 1402) for execution by a machine (e.g., machine 1400), such that the instructions, when executed by one or more processors of the machine (e.g., processors 1404), cause the machine to perform any one or more of the methodologies described herein (e.g., method 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1410 may include a wide variety of components to receive input, provide output, produce output, transmit information, exchange information, capture measurements, and so on. The specific I/O components 1410 that are included in a particular machine will depend on the type of machine. For example, portable machines such as mobile phones will likely include a touch input device or other such input mechanisms, while a headless server machine will likely not include such a touch input device. It will be appreciated that the I/O components 1410 may include many other components that are not specifically shown in FIG. 14. The I/O components 1410 are grouped according to functionality merely for simplifying the following discussion and the grouping is in no way limiting. In various example embodiments, the I/O components 1410 may include input components 1418 and output components 1420, as well as biometric components 1456. The input components 1418 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components, and the like. The output components 1420 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1410 may include communication components 1422 operable to couple the machine 1400 to a network 1424 or devices 1426 via a coupling 1428 and a coupling 1430, respectively. For example, the communication components 1422 may include a network interface component or another suitable device to interface with the network 1424. In further examples, the communication components 1422 may include wired communication components, wireless communication components, cellular communication components, near field communication (NFC) components, Bluetooth® components (e.g., Bluetooth® Low Energy), WiFi® components, and other communication components to provide communication via other modalities. The devices 1426 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
one or more processors; and a memory comprising instructions which, when executed by the one or more processors, cause the one or more processors to perform operations comprising:
assigning a metrics submission interval to an identifier associated with a deployment that comprises a plurality of client devices;
querying each of the plurality of client devices based on the metrics submission interval assigned to the identifier associated with the deployment;
causing a client device from among the plurality of client devices to generate a metrics submission based on the metrics submission interval assigned to the identifier associated with the deployment, the metrics submission corresponding with a metrics category;
receiving, from the client device, a metrics submission that comprises software usage data;
generating a score associated with the metrics category, the score comprising an aggregate value based on at least the metrics submission received from the client device;
causing display of a visualization of at least the metrics submission, the visualization including the score.

2. The system of claim 1, wherein the causing display of the visualization of the metrics submission includes:
determining a visualization type based on an attribute of the metrics submission; and
causing display of the visualization based on the visualization type.

3. The system of claim 1, wherein the metrics submission comprises a duration string that indicates a metrics type of the metrics submission.

4. The system of claim 3, wherein the causing display of the visualization of the metrics submission includes:
causing display of the visualization of the metrics submission based on the metrics type of the metrics submission.

5. The system of claim 1, wherein the generating the score of the metrics category that comprises the aggregate value further comprises:
applying a scoring calculation that comprises of an algorithm that counts all instances of a software application running with a plurality of users;
assigning a point to each client device running the software application running with the plurality of users; and
summing, using the algorithm, the points for the plurality of client devices to generate the score.

6. The system of claim 1, wherein the metrics submission further comprises indications of one or more of:
a frequency of use of a software application executed by the client device;
a number of unique users of the software application at the client device; and
a list of actions executed with the software application at the client device.

7. A non-transitory machine-readable storage medium comprising instructions that, when executed by one or more processors of a machine, cause the machine to perform operations comprising:
assigning a metrics submission interval to an identifier associated with a deployment that comprises a plurality of client devices;
querying each of the plurality of client devices based on the metrics submission interval assigned to the identifier associated with the deployment;
causing a client device from among the plurality of client devices to generate a metrics submission based on the metrics submission interval assigned to the identifier associated with the deployment, the metrics submission corresponding with a metrics category;
receiving, from the client device, a metrics submission that comprises software usage data;
generating a score associated with the metrics category, the score comprising an aggregate value based on at least the metrics submission received from the client device;
causing display of a visualization of at least the metrics submission, the visualization including the score.

8. The non-transitory machine-readable storage medium of claim 7, wherein the causing display of the visualization of the metrics submission includes:
determining a visualization type based on an attribute of the metrics submission; and
causing display of the visualization based on the visualization type.

9. The non-transitory machine-readable storage medium of claim 7, wherein the metrics submission comprises a duration string that indicates a metrics type of the metrics submission.

10. The non-transitory machine-readable storage medium of claim 9, wherein the causing display of the visualization of the metrics submission includes:
causing display of the visualization of the metrics submission based on the metrics type of the metrics submission.

11. The non-transitory machine-readable storage medium of claim 7, wherein the generating the score of the metrics category that comprises the aggregate value further comprises:
applying a scoring calculation that comprises of an algorithm that counts all instances of a software application running with a plurality of users;
assigning a point to each client device running the software application running with the plurality of users; and
summing, using the algorithm, the points for the plurality of client devices to generate the score.

12. The non-transitory machine-readable storage medium of claim 7, wherein the metrics submission further comprises indications of one or more of:
a frequency of use of a software application executed by the client device;
a number of unique users of the software application at the client device; and
a list of actions executed with the software application at the client device.

13. A method comprising:
assigning a metrics submission interval to an identifier associated with a deployment that comprises a plurality of client devices;
querying each of the plurality of client devices based on the metrics submission interval assigned to the identifier associated with the deployment;
causing a client device from among the plurality of client devices to generate a metrics submission based on the metrics submission interval assigned to the identifier associated with the deployment, the metrics submission corresponding with a metrics category;
receiving, from the client device, a metrics submission that comprises software usage data;
generating a score associated with the metrics category, the score comprising an aggregate value based on at least the metrics submission received from the client device;

causing display of a visualization of at least the metrics submission, the visualization including the score.

14. The method of claim 13, wherein the causing display of the visualization of the metrics submission includes:
   determining a visualization type based on an attribute of the metrics submission; and
   causing display of the visualization based on the visualization type.

15. The method of claim 13, wherein the metrics submission comprises a duration string that indicates a metrics type of the metrics submission.

16. The method of claim 15, wherein the causing display of the visualization of the metrics submission includes:
   causing display of the visualization of the metrics submission based on the metrics type of the metrics submission.

17. The method of claim 13, wherein the generating the score of the metrics category that comprises the aggregate value further comprises:
   applying a scoring calculation that comprises of an algorithm that counts all instances of a software application running with a plurality of users;
   assigning a point to each client device running the software application running with the plurality of users; and
   summing, using the algorithm, the points for the plurality of client devices to generate the score.

* * * * *